United States Patent Office 2,808,335
Patented Oct. 1, 1957

2,808,335

METHOD OF PREPARING A TURKEY LOAF

Ted M. Pierce, Tucson, Ariz.

No Drawing. Application October 27, 1953,
Serial No. 388,680

1 Claim. (Cl. 99—107)

The present invention relates to a food product and method of preparing same. More specifically the invention relates to a turkey sandwich loaf and a method for preparing same for commercial marketing and ultimate consumption.

The turkey industry has long needed a means of marketing turkeys in a package which avoids the usual difficulties attendant to the sale of not only whole turkeys but also other forms of processed turkey meat as the market has heretofore known such products. Turkey is frequently stripped of the meat which is then reduced to small pieces and thereafter placed in cans or jars and sold as boned turkey. In other instances the turkey is boned so that the meat is maintained in one continuous piece and then forced into a preshaped can for eventual sale and consumption. A third method of preparing canned turkey is to include with the turkey meat other portions of the fowl in the form of a colloidal dispersion containing the bones and other portions of the fowl in a colloidal state with the bone particles in a colloidal state of subdivision.

While there have been many forms of meat products sold in loaf form for use as a sandwish meat, there has not been any satisfactory sandwich loaf made of turkey meat. A primary object of the present invention is to provide a meat product in the form of a turkey loaf suitable for slicing and subsequent use as a sandwich meat.

A further object of the invention is to provide a novel method of producing a meat product in loaf form which can be sliced in such manner that the slices will not disintegrate or fall apart thereby making the slices suitable for sandwiches or like purposes.

Other objects and advantages will be apparent from the following detailed description of my invention.

In preparing my improved turkey sandwich loaf, I use conventional seasoning such as poultry seasoning, salt and pepper. However, I have discovered that ordinary table salt does not have consistent saltiness and I therefore use kiln dried salt which is a powdered salt and which is found to attack the animal fats thereby retaining the flavor and taste of the turkey. In addition to the seasoning, a very important constituent of the turkey loaf is the use of a proper amount of edible gelatin which maintains the consistency of the loaf enabling the same to be sliced without disintegration and falling apart. Aside from the fact that the cost of gelatin is extremely high, the use of too much gelatin will result in a rubbery product and loss of turkey flavor.

I have found through experimentation, that the best results are obtained by the use of the following ingredients in the amounts indicated:

100 lbs. turkeys
5 lbs. kiln dried salt
5 tablespoons poultry seasoning
5 tablespoons black pepper
10 qts. water
4 lbs. edible gelatin The salt, poultry seasoning and pepper are placed in a cooker with water and stirred until the mixture is dissolved. The turkey is then added. The mixture is cooked for twenty minutes at twenty pounds pressure. The broth is then drained into a pan. The cooked turkey is then boned and the meat placed in the broth. The edible gelatin is then added to the meat and the broth, the mixture being constantly stirred. The mixture is then poured into molds and chilled.

Because of the novel manner of preparing the turkey sandwich loaf as described above, the loaf may be sliced and the slices will retain their shape without falling apart and the loaf has the full flavor of properly prepared turkey. The loaf may be packaged in any suitable manner for ultimate consumption. It is believed that the use of kiln dried salt during the cooking stage before the turkey is boned, attacks the bones, fats and skin of the turkey in such manner as to retain the flavor juices of the turkey and acts to break down the fats to the extent that the edible gelatin can hold the fats suspended evenly throughout the loaf. The edible gelatin also seals in the juices and maintains the meat in an elastic and stable form.

Having thus described my invention, what is claimed is:

A method of preparing a turkey loaf which comprises cooking a turkey with kiln dried salt, poultry seasoning and water, for twenty minutes at twenty pounds pressure, removing the turkey from the broth formed, boning the turkey, placing the boned turkey meat in the broth, adding edible gelatin to the mixture in the amount of 4% of the weight of the turkey, pouring the mixture into molds, and then chilling the mixture.

References Cited in the file of this patent

UNITED STATES PATENTS

| | | |
|---|---|---|
| 2,444,127 | Zublin | June 29, 1948 |
| 2,571,544 | Cutrera | Oct. 16, 1951 |
| 2,633,601 | Snyder | Apr. 7, 1953 |
| 2,640,779 | George | June 2, 1953 |

OTHER REFERENCES

"The U. S. Egg and Poultry Magazine" February 1951, pages 52 and 53, article entitled "Turkey Logs."